US006790034B1

(12) United States Patent
Kearns et al.

(10) Patent No.: US 6,790,034 B1
(45) Date of Patent: Sep. 14, 2004

(54) KILN PLANT CONTROL SYSTEM

(75) Inventors: Michael John Kearns, Roodepoort (ZA); Tony Brian Lange, Johannesburg (ZA); Neville Frewin, Randburg (ZA)

(73) Assignee: Pretoria Portland Cement Company Limited (ZA)

( * ) Notice: Subject to any disclaimer, the term of this patent is extended or adjusted under 35 U.S.C. 154(b) by 0 days.

(21) Appl. No.: 10/129,474
(22) PCT Filed: Nov. 1, 2000
(86) PCT No.: PCT/IB00/01577
  § 371 (c)(1),
  (2), (4) Date: Jan. 21, 2003
(87) PCT Pub. No.: WO01/32581
  PCT Pub. Date: May 10, 2001

(30) Foreign Application Priority Data

Nov. 4, 1999 (ZA) .............................. 99/6942

(51) Int. Cl.[7] .............................................. F27D 19/00
(52) U.S. Cl. .......................... 432/37; 432/14; 432/105; 432/106
(58) Field of Search .......................... 432/37, 14, 105, 432/106

(56) References Cited

U.S. PATENT DOCUMENTS

| 4,498,930 A | 2/1985 | Rake et al. |
| 4,794,870 A | 1/1989 | Visvesvaraya |
| 5,882,190 A | 3/1999 | Doumet |

FOREIGN PATENT DOCUMENTS

| JP | 55-63318 | * | 5/1980 |
| JP | 5-79622 | * | 3/1993 |
| SU | 798530 | | 1/1981 |
| SU | 1375929 | | 12/1985 |

OTHER PUBLICATIONS

George, C. Mike et al., "SPC in the Manufacturing of Aluminous Cement by Sintering," *American Ceramic Society Bulletin* 70 (1991) Apr., No. 4, Westerville, Ohio, USA.
Weichinger, Von M. et al., "Operating Experience With The Automation of a PreCalciner Kiln at the Mannersdorf Cement Plant, Austria," *Zement–Kalk–Gips International* 44 (1991) Jun., No. 6, Wiesbaden, Germany.
6001 Chemical Abstracts, 109 (1988) Nov., No. 20, Columbus, Ohio, USA.

* cited by examiner

*Primary Examiner*—Jiping Lu
(74) *Attorney, Agent, or Firm*—Sterne, Kessler, Goldstein & Fox P.L.L.C.

(57) ABSTRACT

A controller for a kiln plant, typically a cement plant, has a thermodynamic controller which measures a number of variables including the kiln hood temperature and one or more output gas concentrations, and controls the fuel input to the kiln to maintain the hood temperature within a desired range and a main impeller of the kiln to maintain the measured gas concentrations within a predetermined range. The invention includes a quality controller wich controls the amount of $3CaO.SiO_2$ present in clinker produced by the plant. The controller comprises an inner controller which controls free-lime content in the clinker and a thermodynamic outer controller.

19 Claims, 10 Drawing Sheets

FIG. 6

|  | Thood | Tback | CO | NOx | O₂ |
|---|---|---|---|---|---|
| Ctot | 50 | 17 | ▨ | 165 | ▨ |
| %Cback | -4.5 | 3 | -0.003 | 60 | -0.2 |
| FanID | ▨ | 1 | -0.002 | ▨ | -0.05 |
| FanC | -5 | ▨ | ▨ | -30 | ▨ |
| Grate | -10 | ▨ | ▨ | -400 | ▨ |
| Spd | -500 | -25 | ▨ | -1000 | ▨ |

52 ↗ (outputs header) 53 ↙ (inputs header)

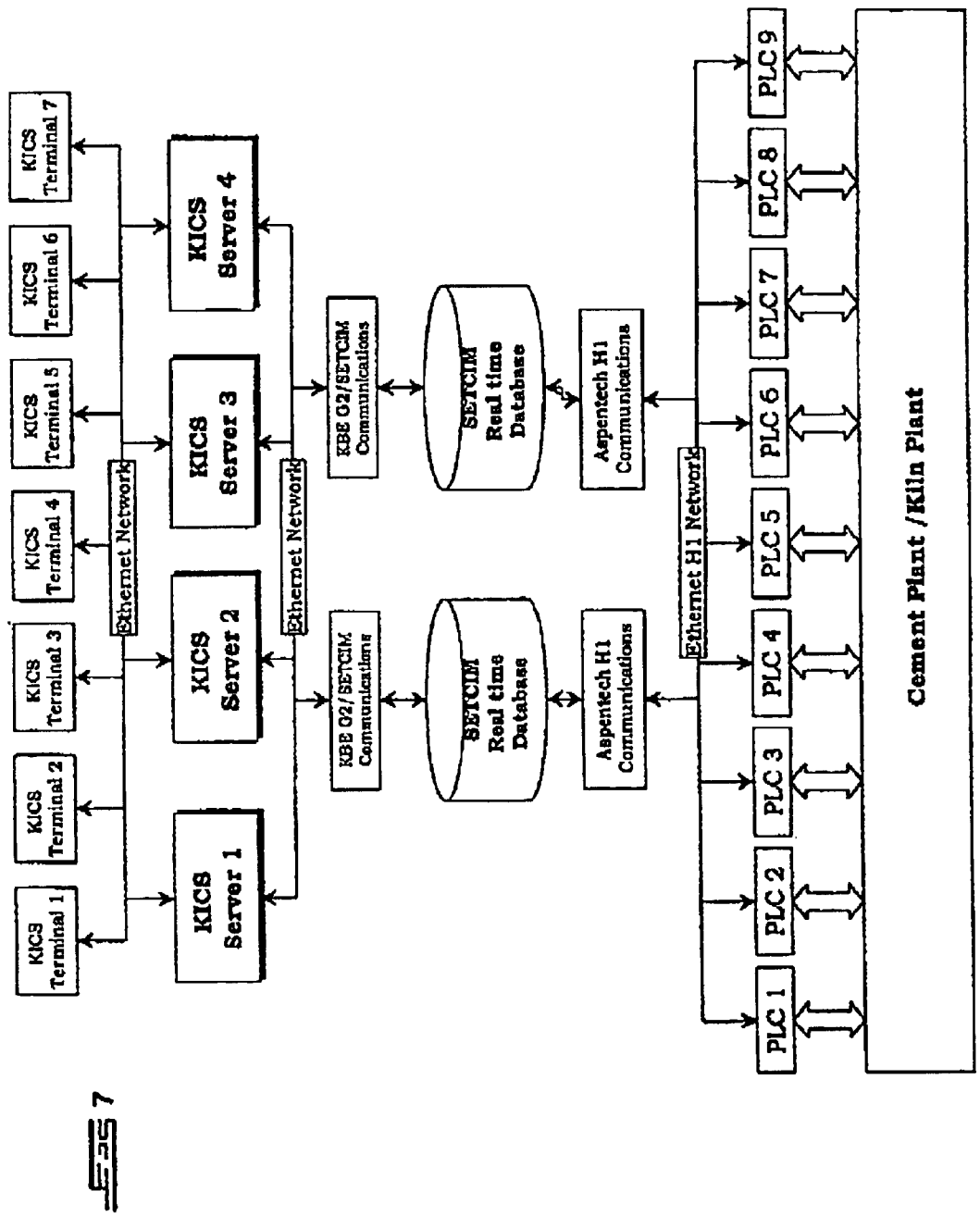

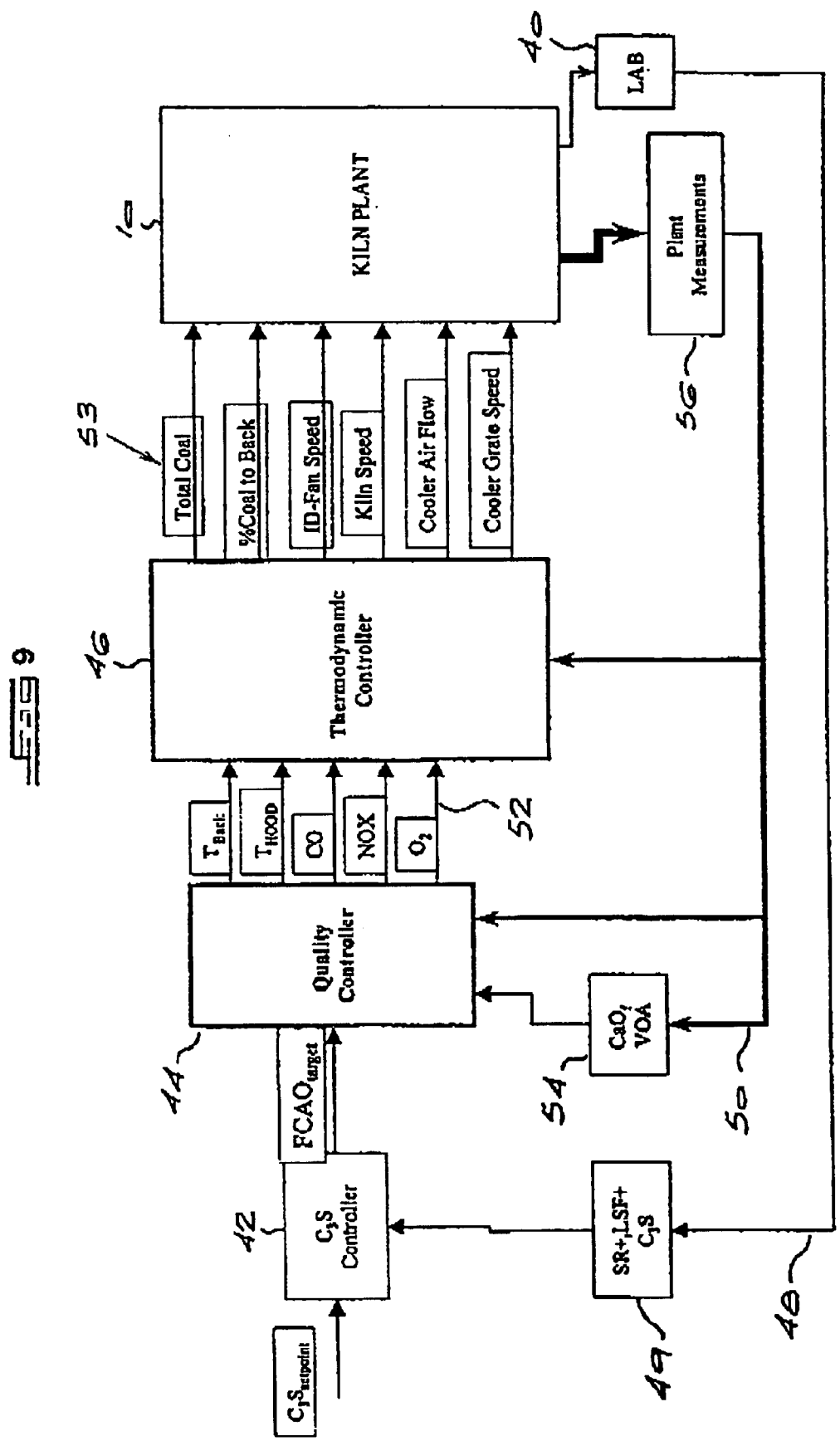

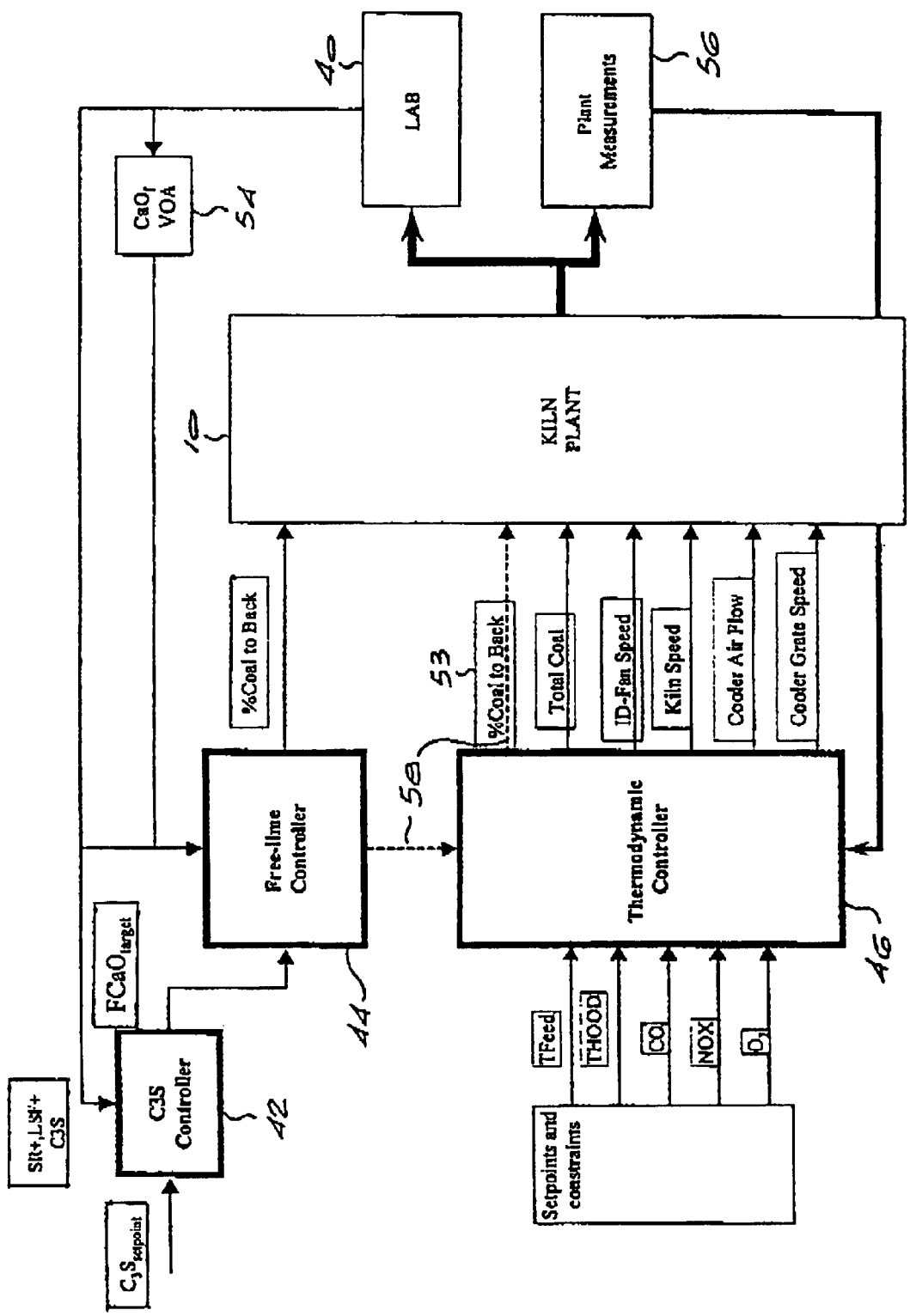

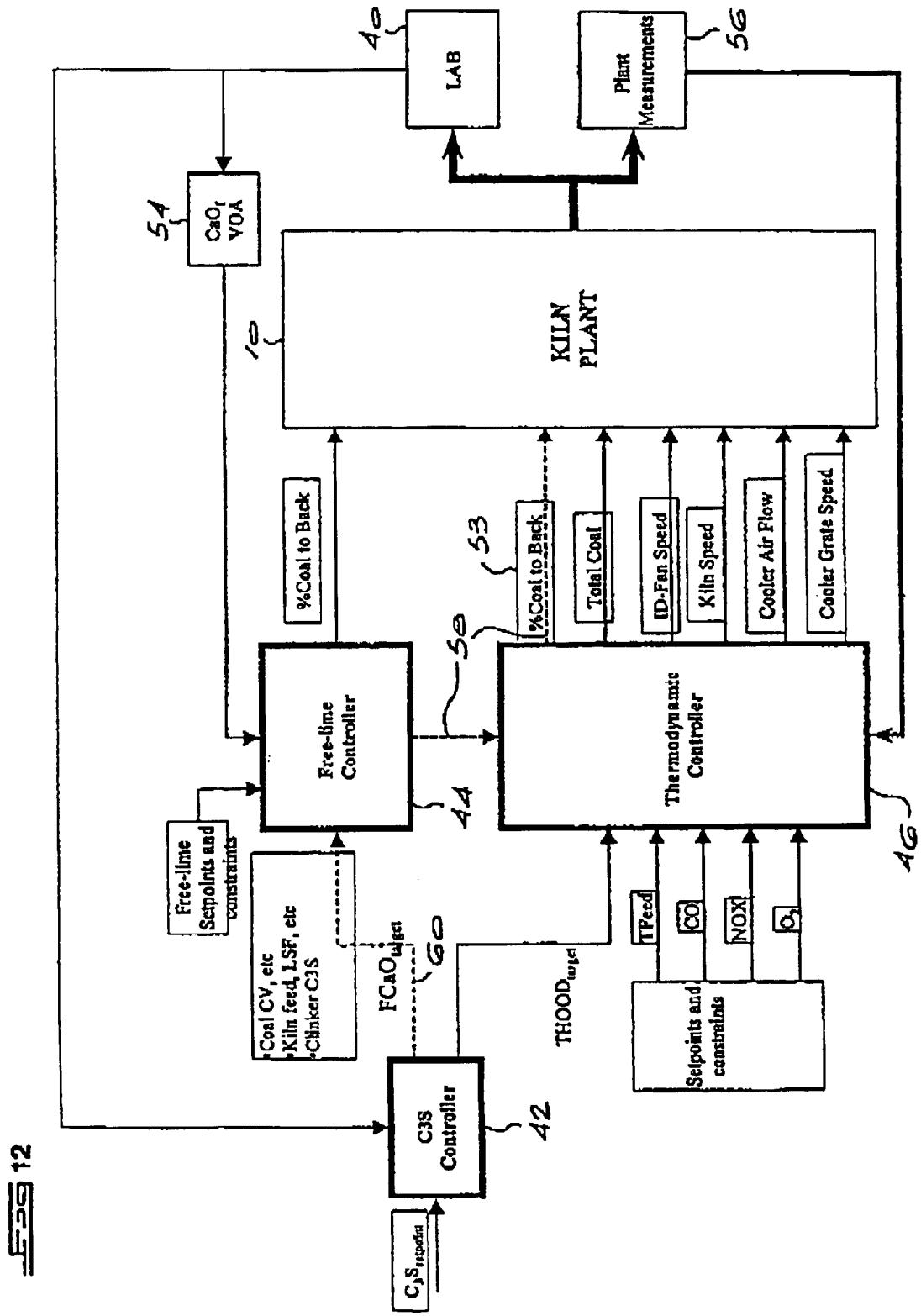

KILN PLANT CONTROL SYSTEM

BACKGROUND OF THE INVENTION

This invention relates to a method of controlling a kiln plant and to a system for implementing the method.

In the manufacturing of cement, a kiln plant is used to convert raw meal to clinker which is then milled together with other materials to produce cement. Due to the large number of variables which affect the operation of the kiln plant and the quality of the clinker, various control systems and methods have been proposed over the years. Nevertheless, it remains difficult to optimise the operation of such a plant, particularly due to variations in the feed material, fuel quality, ambient conditions and other variables.

SUMMARY OF THE INVENTION

According to a first aspect of the invention there is provided a controller for a kiln plant, the controller comprising:

a first temperature sensor arranged to measure the temperature at or near the hood of the kiln and to generate an output indicative of this temperature;

gas sensing means arranged to measure the concentration in the kiln of at least one gas from the group comprising $O_2$, NOX, SOX and CO and to generate at least one respective output indicative of the relevant gas concentration; and control means adapted to receive the output from the first temperature sensor and to control the amount of fuel fed to the firing end of the kiln to maintain the temperature at or near the hood of the kiln within a predetermined range, the control means being further adapted to receive said at least one output from the gas sensing means and to control at least a main impeller of the kiln to maintain the concentration of said at least one gas within a predetermined range.

The controller preferably further comprises a second temperature sensor arranged to measure the temperature at or near the back end of the kiln and to generate an output indicative of this temperature, the control means being further adapted to receive the output from the second temperature sensor and to control the amount of fuel fed to the back end of the kiln to maintain the temperature at or near the back end of the kiln within a predetermined range.

The control means may further include a control matrix which includes values determinative of the relationships between a plurality of plant measurements including the temperature at or near the hood of the kiln, the temperature at or near the back end of the kiln, and $O_2$, NOX, SOX and CO concentrations, and a plurality of operating parameters including the amount of fuel fed to the firing end of the kiln, the amount of fuel fed to the back end of the kiln, the main impeller speed, the kiln speed, the kiln main drive current, the raw meal feed, the cooler air flow and cooler grate speed.

The invention also extends to a method of controlling a kiln plant using the controller described above.

According to a second aspect of the invention there is provided control means for a kiln plant, the control means comprising an outer quality controller cascaded to at least one inner controller, wherein the outer quality controller comprises a first feedback controller being adapted to receive a first setpoint input indicating a desired amount of $3CaO.SiO_2$ and/or $2CaO.SiO_2$ and/or another clinker chemical property to be present in clinker produced by the kiln plant, and a second feedback input indicating the actual amount of $3CaO.SiO_2$ and/or $2CaO.SiO_2$ and/or another clinker chemical property present in clinker being produced by the kiln plant, the first feedback controller being further adapted to compare the first setpoint input and the second input and, if the inputs differ, to produce an output to alter a setpoint input to the inner controller directly or indirectly to adjust one or more of the kiln plant's operating parameters so that the amount of $3CaO.SiO_2$ and/or $2CaO.SiO_2$ and/or another clinker chemical property in the clinker produced by the kiln plant will be substantially equal to the desired amount of $3CaO.SiO_2$ and/or $2CaO.SiO_2$ and/or another clinker chemical property.

Preferably, the inner controller is a free lime controller, wherein the second setpoint input comprises a dynamic setpoint for the free lime content of the clinker to the inner controller, and wherein the inner controller is adapted to receive an input indicating the actual amount of free lime present in clinker being produced by the kiln plant, the inner controller being further adapted to compare the dynamic setpoint for the free lime content and the actual amount of free lime present and, if these differ, to produce an output to directly or indirectly alter one or more of the kiln plant's operating parameters so that the amount of free lime present in the clinker produced by the kiln plant will be substantially equal to the dynamic setpoint for the free lime content.

In a first embodiment of the second aspect of the invention, the control means may still further include a thermodynamic controller, cascaded to the inner controller, wherein the inner controller outputs a setpoint for at least one plant measurement to the thermodynamic controller, and wherein the thermodynamic controller is adapted to receive an input from the kiln plant indicating the value of the at least one plant measurement, the thermodynamic controller being further adapted to compare the setpoint for the at least one plant measurement and the value of the at least one plant measurement and, if these differ, to produce an output to alter one or more of the kiln plant's operating parameters.

Preferably, the inner controller is arranged to output a plurality of dynamic setpoints for a plurality of plant measurements to the thermodynamic controller, the plurality of plant measurements constituting controlled variables and being selected from the group including the back end temperature, the hood temperature, the level of CO, the level of NOX, the level of SOX and the level of $O_2$.

The kiln plant's operating parameters may comprise one or more of the group constituting manipulated variables comprising the total fuel fed to the kiln plant, the percentage fuel fed to the back of the kiln plant or any other derived measurement or indication of the fuel being fed to the plant, the main impeller speed, the kiln speed, the cooler air flow and the cooler grate speed. These parameters are manipulated to alter the plant measurements to approach respective setpoints, using a control matrix which includes values determinative of the relationships between the operating parameters and plant measurements.

In a second embodiment of the second aspect of the invention, the control means may still further include a thermodynamic controller connected to the kiln plant, wherein the thermodynamic controller is adapted to receive an input from the kiln plant indicating the value of at least one plant measurement, the controller being further adapted to compare a setpoint for the at least one plant measurement and the value of the at least one plant measurement and, if these differ, producing an output to alter one or more of the kiln plant's operating parameters, wherein the at least one of the kiln plant's operating parameters controlled by the thermodynamic controller is different from the one or more operating parameters controlled by the free lime controller.

The at least one or more of the kiln plant's operating parameters controlled by the thermodynamic controller comprise at least one of the group comprising the total coal fed to the kiln, the main impeller speed, the kiln speed, the raw meal feed, the cooler air flow and the cooler grate speed and wherein the kiln plant's operating parameter controlled by the free lime controller is the percentage fuel fed to the back of the kiln.

In a third embodiment of the second aspect of the invention, the inner controller is a thermodynamic controller, wherein the second setpoint input from the outer quality controller to the thermodynamic controller is a setpoint for at least one plant measurement, and wherein the thermodynamic controller is adapted to receive an input from the kiln plant indicating the value of the at least one plant measurement, the thermodynamic controller being further adapted to compare the setpoint for the at least one plant measurement and the input indicating the value of the at least one plant measurement and, if these differ, to produce an output to alter one or more of the kiln plant's operating parameters.

The at least one plant measurement may be one or more of the plant measurements selected from the group including the back end temperature, the hood temperature and the level of NOX.

Preferably, the at least one plant measurement is the hood temperature.

In this embodiment, the control means also includes a free-lime controller arranged to receive a setpoint input for the free-lime content of the clinker and an input indicating the actual amount of free-lime present in clinker being produced by the kiln plant, the free-lime controller being further adapted to compare the setpoint for the free-lime content and the input indicating the actual amount of free-lime present and, if these differ, to produce an output to directly or indirectly alter one or more of the kiln plant's operating parameters so that the amount of free-lime present in the clinker produced by the kiln plant will be substantially equal to the setpoint for the free-lime content.

The setpoint for the free-lime may be received from the $3CaO.SiO_2$ controller, or may be manually inputted by an operator of the controller.

The one or more operating parameters controlled by the free-lime controller are different from the one or more operating parameters controlled by the thermodynamic controller.

Preferably, the operating parameter controlled by the free-lime controller is the percentage fuel fed to the back of the kiln.

The invention also extends to a method of controlling a kiln plant using the controller described above.

BRIEF DESCRIPTION OF THE DRAWINGS

FIG. 3 is a simplified block diagram illustrating the basic steps in cement production;

FIG. 6 is a matrix illustrating the relationship between the variables utilised by the controller.

FIG. 7 is a simplified block diagram of the existing control system of a cement plant used to test the method and system of the invention;

FIG. 9 is a schematic block diagram showing a first embodiment of the control loop arrangement of the controller of the invention;

FIG. 11 is a schematic block diagram showing a second embodiment of the control loop arrangement of the controller of the invention; and FIG. 12 is a schematic block diagram showing a third embodiment of the control loop arrangement of the controller of the invention.

DESCRIPTION OF EMBODIMENTS

Figure 1:
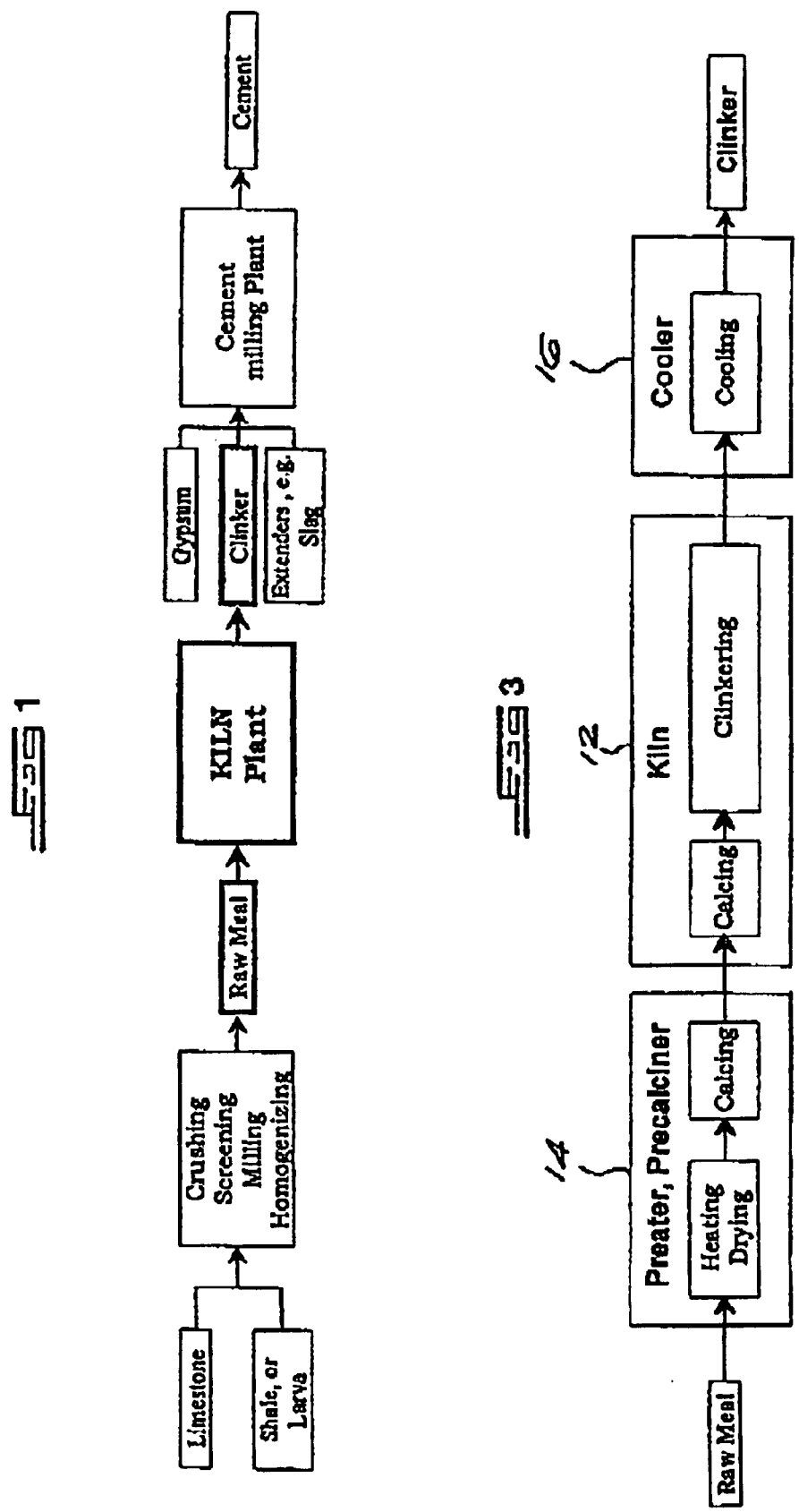
FIG. 1 is a schematic block diagram showing the basic arrangement of a cement production plant.

FIG. 1 shows, in a simplified block diagram form, the basic arrangement of a cement production plant.

Figure 2:
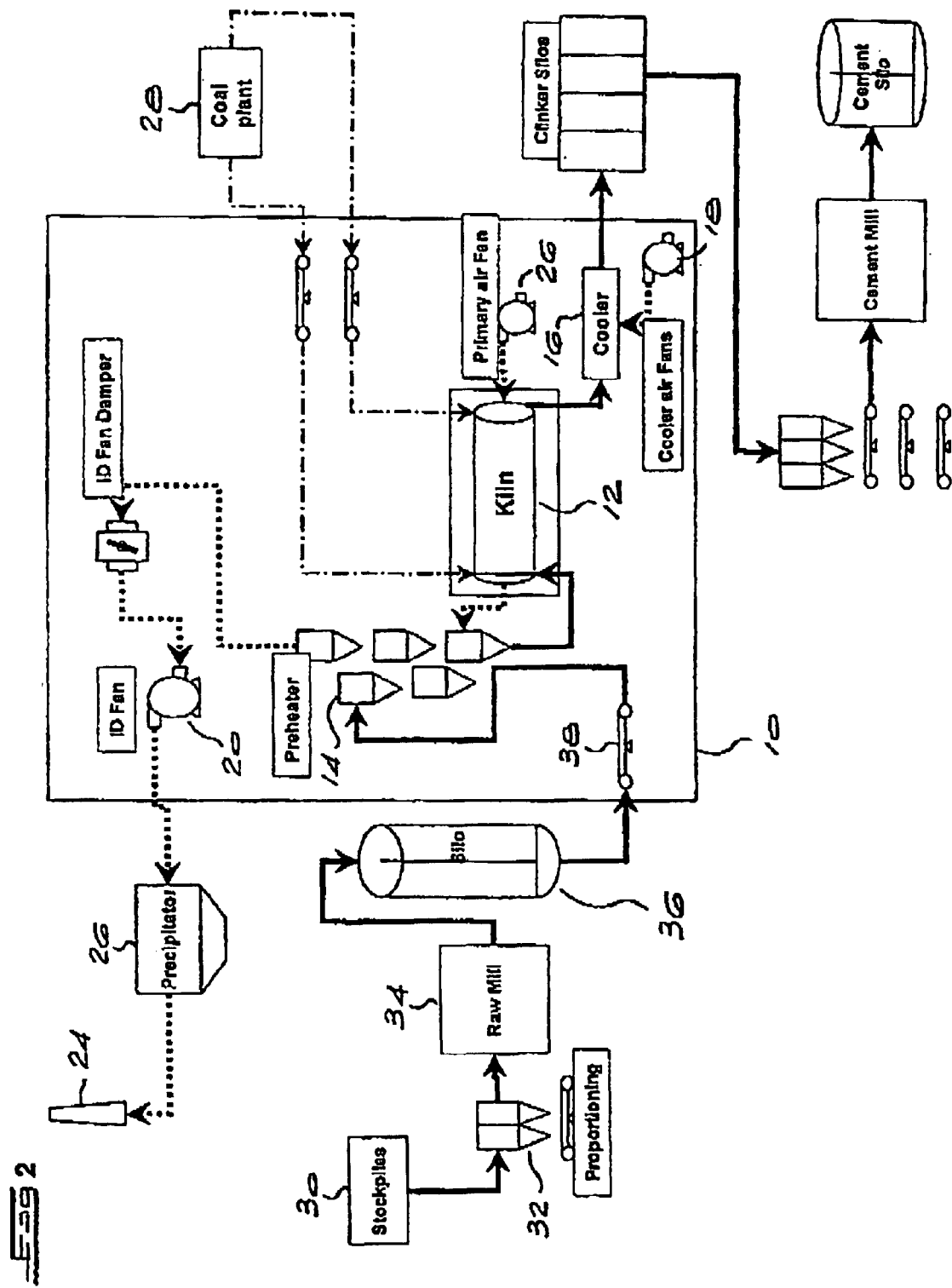
FIG. 2 is a more detailed schematic block diagram of the cement production plant, showing the kiln plant thereof in more detail.

The core of the cement plant is the kiln plant, the primary piece of equipment of which is the kiln itself. The kiln is the primary process unit in which clinker is made. The kiln plant comprises the kiln as well as a number of additional up-stream and down-stream process units. The number of these additional units surrounding the kiln depends on the type, design and age of the cement plant. FIG. 2 shows a typical kiln plant 10 including a kiln 12 and associated equipment, described in more detail below.

Cement is made primarily from clinker (>75%) and other constituents, such as gypsum and various other extenders. The cement plant uses as its raw materials inputs, limestone, and various other minerals, such as clay, shale, and materials containing iron oxide. The input materials are crushed, screened, milled, and mixed to form raw meal, which is the primary feed to the kiln plant. The kiln plant produces clinker, which is then mixed and milled with gypsum or other extenders such as slag to form cement. The overall process is shown in FIG. 1. The method and system of the invention controls the kiln plant only, i.e. the transformation of raw meal into clinker, and not the entire cement plant.

The process that transforms raw meal to clinker in the kiln plant is called "burning" or sintering and is basically a multistage process which primarily uses hot air to effect the necessary chemical and metallurgical transformations in the raw meal. Most of the process transformations take place in the kiln 12 which is typically a slowly rotating steel tube 3 to 5 m in diameter and with a length ranging from 50 to 250 m and typically around 80 m. The tube is inclined at a slight angle to the horizontal. The raw meal moves through the kiln by virtue of the rotation of the tube, whereby material slowly shifts or slides down the kiln due to its incline to the horizontal.

On older or simpler kilns all transformations take place in the kiln. In more modern plants, the first part of the process typically takes place in an upstream unit called a pre-heater or pre-calciner 14, where preheating, drying, and calcining takes place. This process is shown in FIG. 3. The actual clinkering process as well as some calcining then takes place in the kiln. The objective of splitting up the process into the pre-heater/calciner plus kiln configuration is to achieve better heat efficiencies and to vent less heat to waste. The cement plant to which the prototype method and system of the invention were applied uses a pre-heater.

The following description applies to the prototype kiln plant and it will be appreciated that various changes may be required to implement the invention in a kiln which operates differently.

Referring to FIG. 2, the raw meal which is used as the feed material to the kiln is obtained by mixing raw materials from stock piles 30 in a proportioning plant 32, from where they are fed to a raw mill 34 which comminutes the raw meal. The raw meal is stored in a raw meal blending or homogenizing silo 36 and fed by means of a raw meal feeder conveyor 38 in the kiln plant 10 to the pre-heater/pre-calciner 14.

In general and irrespective of the physical arrangement of the kiln plant, the first process is the drying and heating of the raw meal to approximately 800° C. to 1000° C., where all moisture, both free and inherent in the raw meal, is driven off. In addition, certain chemical reactions start to take place where for example the calcium carbonate and any magnesium carbonate in the raw meal are split up into calcium and magnesium oxides and carbon dioxide which leaves with the gases (referred to as "calcining"). The reactions involved are endothermic. In the case of a pre-heater configured plant, this calcined or partially calcined material is then fed into the kiln at the "feed end". This material slowly slides down the kiln towards a flame located at the other end of the kiln called the "firing end". This process can also take place in a precalciner placed in parallel to the pre-heaters.

As the temperature increases, the alumina and iron oxides in the material start to react with the calcium oxide to form calcium aluminates, mainly $C_3A$, and calcium alumino ferrites, typically $C_4AF$. These materials have a relatively low melting point, and form a melt or liquid in the material mix called a flux. The presence of this melt assists in bringing solid calcium oxide particles and solid silica and silicate particles together to react to form calcium silicates. Initially all silica is converted to di-calcium silicate ($2CaO.SiO_2$), and to tri-calcium silicate ($3CaO.SiO_2$). The latter process is primarily an exothermic processes.

The final silicate reactions take place in the burning zone of the kiln where the flame is located and where the temperatures are approximately 1400–1500° C. The reactions take place with the material in a partial melt form, which is sometimes called sintering.

The clinker that exits the kiln is very hot, approximately 1300° C., and needs to be cooled down to ambient temperature. This is done in a cooler unit 16 which utilizes one or more fans 18 and which is downstream from the kiln. The cooler in the prototype plant was a grate cooler. Various other types of coolers can be used, for example planetary coolers. Planetary coolers do not have separate fans like grate coolers.

The heating of the kiln is performed by injecting coal or other fuels (e.g. oil, tyres, gas, waste materials) into the kiln and then igniting this fuel to create heat from a long flame. The fuel ignition becomes self-sustaining once the kiln has reached a sufficiently high temperature. The injection of fuel can be done at both ends of the kiln, but the primary point of coal (fuel) input is at the "fire-end" of the kiln. In order to keep the combustion process going, air must be sucked through the kiln to provide oxygen. This is done by a main impeller in the form of an induced draft fan (ID fan) 20 which is connected to the kiln via ducts and piping. If a pre-heater or pre-calciner is used, then these units are situated between the ID fan and the kiln, so that the air is drawn through the kiln, then the pre-heater/pre-calciner, and finally through the ID fan itself. After exiting the ID fan the air is passed through a dedusting system such as a static precipitator 22 and then vented to atmosphere via a stack 24.

The air drawn into the kiln comes from two main sources, the primary air being air injected by a primary fan 26 with the coal which is being pneumatically conveyed from a coal plant 28 and injected into the kiln, and the secondary air which is drawn from the cooler 16. The air from the cooler is hot due to the heat exchange process that takes place between the hot clinker being fed into the cooler, and the cooler air (ambient temperature) being drawn or blown in the cooler.

The cooler can take various forms but the cooler used for testing this invention was a grate cooler, which has a number of fans pumping ambient air into the cooler.

It will be understood from the above description that there is a counter-current flow of air to the flow of material in the kiln plant. This airflow is thus as follows: air enters the cooler, which is heated by the hot clinker exiting the kiln. This heated air, called "secondary air", is then fed into the fire-end of the kiln where it aids the heating and combusting process in the kiln. This heated air becomes hotter, and then exits the kiln where, if a pre-heater, or pre-calciner is used, it is fed into these units to affect the calcining and drying process therein.

The hot air exiting the kiln is used in the pre-heater and/or pre-calciner to pre-calcine, heat and dry the raw meal, where through the heat exchange process in the pre-heater the air becomes progressively cooler. The air exits the pre-heater at approximately 300° C. This exit air is then possibly used elsewhere in the plant to dry material in the raw meal or coal plants before ultimately being fed into a dedusting system and then being vented to the atmosphere. With plants with no pre-heaters or pre-calciners, heat exchangers in the form of crosses/chains/lifters which are usually in the form of steel plates or steel chains fitted into the inside of the feed end of the kiln, are used to effect this heat exchange. This exit air also exits at approximately 300° C. before being fed into the dedusting system.

In general, operators control the kiln plant by adjusting the behavior of a number of units or pieces of equipment in the plant in response to the plant states. Knowledge of the plant states is inferred by the operators from information being displayed by the plant supervisory, control and data acquisition system (SCADA), distributed control system (DCS), or other forms of electrical instrumentation.

Information is fed to the SCADA system by various sensors installed throughout the plant. These sensors provide information on the state of various pieces of equipment, as well as the state of the processes taking place. Essentially the SCADA system provides a view or "window" into the kiln plant, by displaying data in the form of icons, tables, graphs or plots. The SCADA system also provides the means with which the operators change or control the various equipment, by switching equipment on or off, starting or stopping sequences, or providing setpoints to various pieces of equipment.

The operators have a number of control tasks to perform, these being the control of the plant from a mechanical and safety point of view, as well as the control of the plant in terms of production and quality.

However, it will be appreciated that the various sources of heat in the kiln, namely from the flame located in the kiln hood, from the exothermic chemical reactions and the heat retrieved from the cooler make the thermodynamics of the kiln very difficult to control.

Thermodynamic control of the kiln plant is the control of the kiln plant so as try to maintain the efficient production and quality of the clinker as discussed above. Thus the primary objective of thermodynamic control is to continuously produce clinker meeting the quality specifications, whilst at the same time reducing production costs through the minimization of fuel consumption and stresses to the plant mechanically, in particular the kiln refractories. This purpose is achieved by controlling the thermodynamic state of the kiln plant. The kiln plant includes the cooler, kiln, pre-heater and, if it exists, the pre-calciner. When the thermodynamic controller is controlling the thermodynamic state or profile of the kiln plant, then other higher level objectives of the total controller can be met, i.e. the quality of the clinker can be controlled.

A first aspect of the present invention is therefore the provision of control means to control the thermodynamics of the kiln plant.

Thermodynamic control of the kiln plant is addressed by observing the plant states through sensor measurements, and then adjusting the plant unit's behavior so as to maintain the correct thermodynamic conditions to in turn effect the correct calcining and clinkering process. At the same time, maximum production must be maintained, and the various costs minimised.

Figure 4:
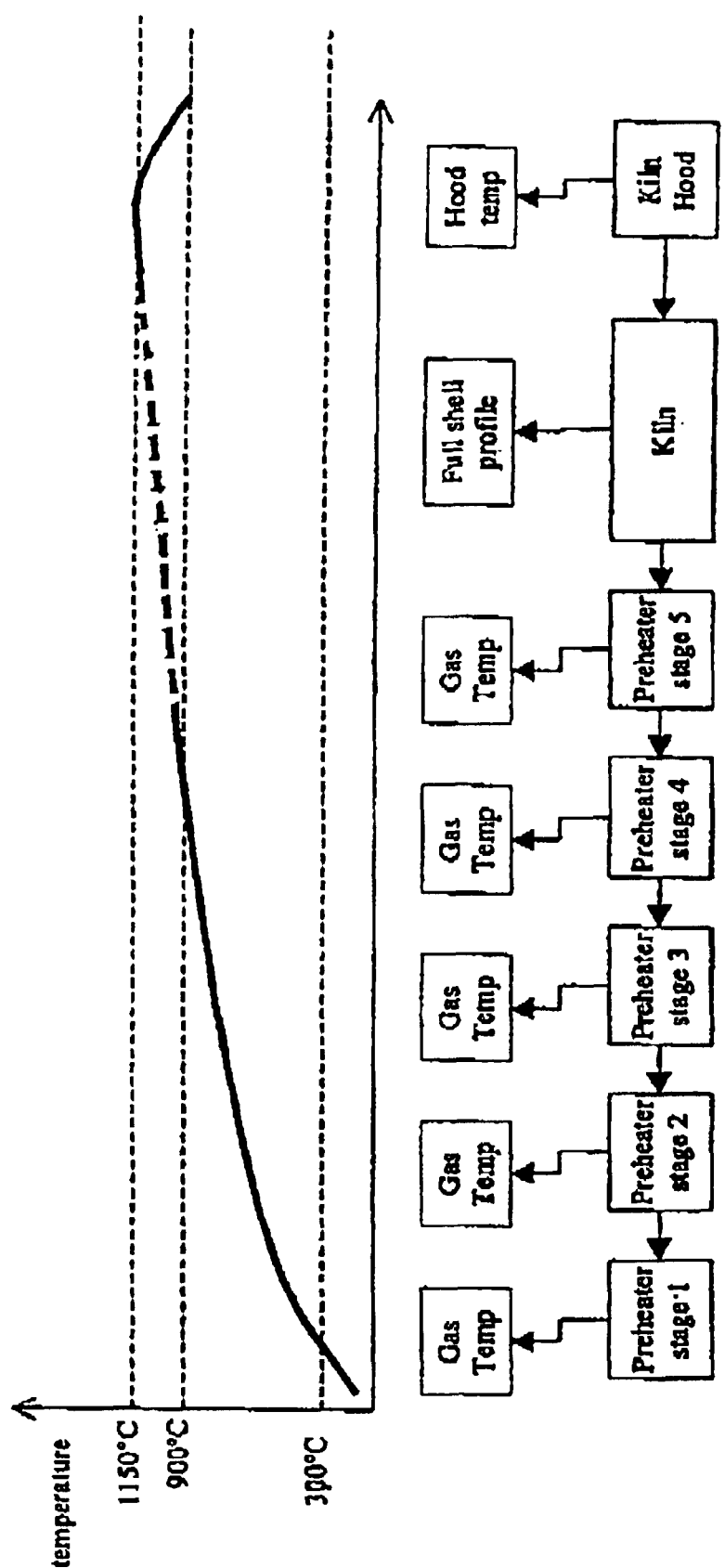
FIG. 4 is a graph showing a typical temperature profile along the kiln plant.

The most direct indication of the thermodynamic state of the kiln plant is the temperature profile along the kiln plant, which includes the kiln and upstream and downstream units to the kiln i.e. the cooler, pre-heaters and pre-calciners. This temperature profile can range from a single point to a multi-point indication of the profile. A simplistic temperature profile (not to scale) is illustrated in FIG. 4.

There are in general too many factors for an operator to take into account at all times when attempting to control the kiln plant manually, and optimization is thus simply not possible to achieve manually. Eventually some acceptable steady state performance is reached, where the kiln is performing adequately in terms of throughput and quality. This is relative to today's standard of kiln operation, which is based on manual or partially automated control.

The difficulty in manual control is partly due to the difficulty in ascertaining what is going on inside the kiln, from both a process and a metallurgical point of view. This is a universal problem, which is especially accentuated in high temperature systems where direct continuous industrial temperature measurement does not exist. This not only includes the actual thermodynamic conditions, but the actual metallurgical and physical states of the material being converted into clinker, as well as the state of the coating that adheres to the refractory bricks of the kiln. It is currently assumed that the instrumentation around the kiln is sufficient to allow for valid and correct assumptions to be made about the thermodynamic and clinker production process in the kiln.

Furthermore, laboratory measurements are in general labour intensive and these quality measurements are only available approximately one hour after the sample was taken. At the plant used to test the invention the sample collection and most analysis is automated, in addition to manual sampling and analysis. Laboratory analysis is also performed on the raw meal feed to the kiln, as well as on the coal being used for heating. Again these measurements are only available some time after the samples are taken.

In addition, changing the thermodynamic conditions in the kiln to compensate for the source of the problem also takes time. Compounding this is the fact that the results of some of the control actions take seconds to manifest but in other cases take 20 minutes to an hour. In particular, changes to the gas or air state of the kiln manifests relatively rapidly (order of seconds), while changes to the thermodynamic or temperature state manifest relatively slowly (order of minutes), and changes to the quality or metallurgical state, i.e. free-lime and $3CaO.SiO_2$, manifest more slowly still (order of an hour).

Compounding this further is the fact that there is a delay before a temperature change in one part of the system, e.g. in the cooler or kiln, has an effect which is noted in the pre-heater, and vice versa. In addition there are intrinsic delays caused by flow of material in the kiln and cooler.

The time delays thus further complicate the control of the kiln plant, in that the operators tend to take action too late to compensate for disturbances.

The kiln experiences a number of major disturbances during operation. These disturbances include:

(1) "poking" in which inspection doors are opened in the feed-end riser pipe on the bottom of the pre-heaters, or other parts of the pre-heaters, and cold jets of air and/or water are used to introduce pneumatic and thermal shock to deposits and build-up of materials which have to be cleared to enable continuous and free flow of partially calcined material from the pre-heaters in the kiln.

(2) "coating drop" where part of the clinker coating in the kiln falls off the inner linings or refractory bricks in the kiln, causing an unexpected increase in the flow of very hot material into the kiln.

Both these types of disturbances cause great thermal disturbances in the kiln plant as a whole, and are very difficult to control manually. They therefore usually result in a large of amount of off-specification material being produced, as well as thermodynamic disturbances which can last for up to a few hours.

It will thus be appreciated that all of the above factors taken together make the efficient control of the kiln very difficult to achieve manually or using the partially automated controllers available at present.

In a first aspect of the present invention, a new type of kiln controller has been implemented which focuses on controlling the thermodynamics of the kiln in order to effectively control the quality and throughput of the kiln.

Referring again to FIG. 4, the temperature profile along the kiln is determined from temperature sensors which are ideally arranged at intervals from the cooler to the pre-heater along the physical length of the kiln plant. The sensors will typically be thermocouples, but may be any other type of temperature sensor, such as pyrometers.

The measured temperatures can also be derived using, for example, an average or another kind of mathematically derived or filtered temperature which indicates the thermodynamic state of the kiln in the vicinity of the kiln hood or wherever the measurement is being made.

It is preferable to have more sensors available to provide a more precise temperature profile. However, if the precise temperature profile or shape is not known, the control of the kiln can be limited to the number of thermodynamic control handles available.

Where only one sensor is used, this sensor will measure the hood temperature in the kiln, which is the most important temperature measurement. However, the preferred number of sensors is at least two, giving two degrees of freedom in terms of controlling the temperature profile. For a two point temperature profile, another temperature measurement is required at the feed end of the kiln plant, such as the kiln back end or feed end. If a pre-heater system exists, a sensor may be placed at some point in the pre-heater system, or at the top of the pre-heater.

To achieve thermodynamic control of the plant, the sources and sinks of energy within the plant must be controlled so that there exists an optimal heat balance in the kiln, which will in turn require the minimum amount of energy to effect correct clinker production that meets minimum quality requirements. Thus the coal feed input energy is minimized, the recovery of secondary heat from the coolers is maximized and, with a grate cooler, a minimum amount of energy or heat is vented from the backend of the cooler through the cooler ID-fan to atmosphere.

The heat and hence temperature profile in the kiln plant is controlled, according to the present invention, using a multivariable thermodynamic controller, which has a number of controlled variables as well as a number of manipulated variables. The controlled variables are usually a number of process variables that give information and knowledge of the state of the kiln.

Figure 5:
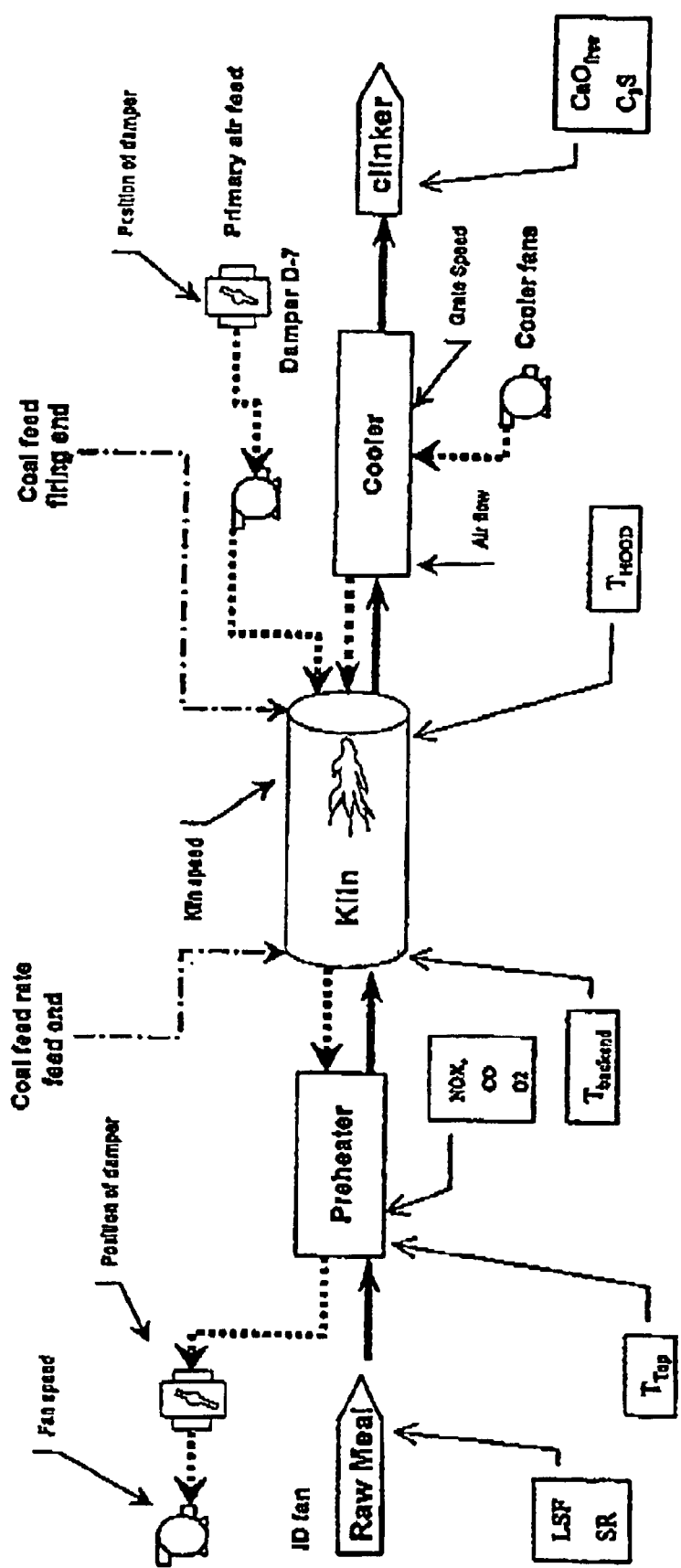
FIG. 5 is a schematic diagram illustrating the source of the various monitored variables utilised by the controller.

In the prototype system, the thermodynamic controller was implemented as a 6×5 control matrix, i.e. 6×5 single input, single output (SISO) control pairs, where each pair or matrix element consists of a controlled variable (CV) 52, and a manipulated or disturbance variable (MV, or DV) 53. FIG. 5 shows schematically the source of the relevant variables. The control matrix is illustrated in FIG. 6.

The controlled and manipulated variables configured on the test plant were:

Controlled Variables (CVs)

(1) Hood temperature (THood). The hood temperature is measured near the firing end of the kiln, and is indicative of the temperature of the air etc, near the firing end of the kiln. This temperature may be the exact value as measured, or can be a derived value from a number of temperature sensors that give the same or similar temperature information. During normal operations this temperature would be between 800° C. to 1200° C., typically 1120° C.

(2) A back end temperature (Tback). This temperature is measured near the feed end of the kiln, or at a point in the kiln plant that is indicative of the exit air temperature from the kiln plant and which is thus indicative of the quality of heat transfer that has taken place with the kiln plant. For the subject plant it is optimally the top temperature of the pre-heater, as selecting the measurement near the kiln feed end ignores the heat transfer that takes place in the pre-heater or pre-calciner. Again this measurement can be a derived measurement of a number of other temperature measurements. During normal operations this value is between 250° C. to 350° C., typically 305° C.

(3) $O_2$ (%). This is a measurement of the oxygen concentration in the kiln, and is indicative of the combustion process in the kiln. During normal operations the value is between 2 to 5%, typically 4%.

(4) NOX (ppm). This is the concentration of NOX in the air existing in the kiln and is produced in the flame, and is hence indicative of flame temperature. This measurement value could be between 300 to 2000 ppm, and is typically 700 ppm. Due to problems with calibration the relative value of this measurement is more important than its absolute value.

(5) CO (%). This is the concentration of carbon monoxide or CO in the exit air from the kiln. A typical value is about 0.03%. This controlled variable is very important as if it is too high, there can be a danger of explosions in the precipitator, and thus this CV has to be monitored very carefully.

(6) It is envisaged that the SOX concentration could also be used as a controlled variable.

(7) Manipulated variables (MV) or disturbance variables (DV)

(8) Total coal flow (Ctot). This is the total mass flow of coal being pumped into the kiln from both the fire-end and the feed-end, typically 10 to 12 tons per hour (tph) for the subject kiln plant.

(9) % Coal to back (% Cback). This is the percentage of the total coal being pumped to the feed or back end of the kiln. The percentage ranges from 5 to 15%, typically 12%, and is dependent on the type of kiln.

(10) Kiln Speed (Spd). The rotational speed of the kiln which is 1 to 3 rpm, typically 1.6 rpm. Kiln feed or raw meal feed is linked to kiln speed and is typically in the range 50 to 400 tons/h or more.

(11) Grate Speed (Grate). Grate speed is the speed of the first grate motor on the grate cooler. This is expressed as a percentage of maximum grate speed.

(12) Cooler Air Flow (FanC). A derived air flow figure measured in $m^3/hr$ which could be either the sum or average of a number air flow fan systems pumping air into the cooler. The value for the subject plant is the total of three air fan flow rates, which are all under PID control. Should the PID control of any one fall away, then the system can be adapted to disregard that fan and use any of the others. These air flows are three of approximately 20 fans located in the cooler, and are those considered by the plant personnel to be the most influential in terms of cooling.

(13) ID fan speed (FanID). Relative speed of the ID fan to its maximum speed. The ID fan is normally a variable speed fan. Should the ID fan not be a variable speed fan, then the damper position of the ID fan damper can be used, i.e. this variable has to be something that provides direct control of the amount of air being drawn into the kiln.

The MV's and CV's are not necessarily limited to the above and can be extended, or can be made smaller. For example, on some kilns there is no back end firing, and some plants have a fixed speed ID-fan, so the ID-fan damper setting is used. Another example where a subset is used is where the plant does not have all the gas analyzers available. When, for example, the NOX reading is not available, the controller cells related to this can be made "inactive" by switching off these cells so that this CV is effectively removed from the various optimizing equations that are being solved. This can be done by setting the weighting factors for NOX to zero.

The contents of each cell matrix in FIG. 6 is a mathematical description of the interaction of each CV with the appropriate MV or DV, e.g. how the hood temperature will respond to a change in the total coal input. These descriptions are currently time-based descriptions, and are derived either through first principles, or automatically using the controller or other "offline toolkit", where the characteristic response is derived automatically from data captured from the plant. There are other means for specifying the characteristic response of a particular variable to another, and this could be in the "S" or frequency domains, for example. These response descriptions are typically either first or second order responses, with time delays. The gains of the responses are derived either automatically using the controller toolkit, or can be specified manually. Each cell has a time response curve, the magnitude of the response i.e. the starting point and the final steady state value, being the gain.

The gain value to any cell could be constant, linear, or even a function of one or more other variables.

Each one of the 5 controlled variables has a relationship with each one of the 6 manipulated variables, making the controller a multi-variable controller. If one manipulated variable is moved, say, total coal, it will have an effect on each of the 5 CV's. The aim of the controller is to enable one to set up a desired value for a target variable, and then to allow the controller to manipulate the manipulated variables in such a way that they do not move from their targets or are kept within an allowable range. Thus we have a thermodynamic controller, conceptualized as a 6×5 matrix of interacting manipulated and controlled variables.

Although the above matrix could be implemented using a number of software packages, the controller on the test plant was implemented using "Process Perfecter" (trade mark) software by Pavilion Technologies.

In terms of the use of Process Perfecter for the multivariable non-linear controller, the matrix of 30 relationships has to be defined, so that the controller will know that if a manipulated variable moves in a certain way, then the controlled variables will respond in a known and specific fashion. This relationship is the single output, single input response of the controlled variable to the manipulated variable.

In order to get the controller to work, a system identification procedure has to be performed which identifies the 30 relationships. There are two ways of doing this system identification. These are to perform the identification automatically using the Process Perfecter "auto identification" module, or to use experience and first principles to derive the relationships. These relationships are then specified as a variety of first or second order responses. If there is no relationship between a manipulated and controlled variable, then we say that the model representing this pair is zero. The use of plant step tests can also be used to create step tests data to be used to derive the relationships by any one of the above means.

These relationships are given as a set of parameters, which can be graphed as a time response, where the x-axis is time, and the y-axis is the magnitude of the response of the controlled variable to a step move in the controlled variable. The model for the time response of each manipulated/controlled variable pair is represented by a time response over a certain time interval and with the plant actually used is 110 time intervals, where each interval has been chosen to be 1 minute. The time interval of 1 minute was chosen as a result of a study in which the overall time constants in the kiln processes were observed, and the operators and experts observed as to how often they make changes to the kiln, and how fast the kiln reacts. Obviously, the number of time intervals and the length of the time interval could be varied according to control requirements, and the process characterisation of the specific kiln being automated.

In addition, for the purposes of simplification, the variables associated with the thermodynamic controller can be split up conceptually into "gas" and "thermodynamic" variables.

Gas states or variables refer to the gas pressures, air flows, fan speeds and gas composition. Thermodynamic states refer to the temperatures, and mechanical states of the kiln, which are indicated primarily by temperatures, mass flows, kiln speed, and kiln torque which is indicated in turn by kiln main drive current. The reason for this classification is that the gas dynamics are faster than the other thermodynamic responses and thus some of the dynamics are easier to understand in this regard.

All the variables are in effect thermodynamic variables.

The kiln main drive current is also an indicator of the thermodynamic state and the clinkering process within the kiln. The main drive current is proportional to the torque required to drive the kiln, which is in turn indicative of the amount of material and clinker coating within the kiln, as well as being indicative of how the coating and brick lining is distributed around the inner shell of the kiln. Thus, the kiln main drive current can be used as a disturbance variable in the thermodynamic controller. In the prototype system, it was effectively taken into account as an unmeasured disturbance, but it can also be taken into account as a measured disturbance.

The gains of the prototype thermodynamic controller responses are summarized in the gains matrix.

The grey cells indicate that, for this particular version of the controller, no model has been included for the following possible reasons:

(a) Knowledge and experience, step tests, etc, have shown that there is no relationship between the specific controlled and manipulated variable, or that the relationship is so weak that, leaving it out has no appreciable effect on the kiln operation.

(b) Experience and testing of the controller has shown that there are conflicting moves that are made by the controller when the model in that area is active, thus causing oscillation, or instabilities in the closed loop control of the kiln plant. An example is the use of both the total coal flow and the ID-fan to control hood temperature.

Once these matrix elemental responses have been specified they can be changed or modified as more knowledge or information comes to light, thus allowing for incremental or quantum improvements to the controller as experience is obtained. In addition, the controller can be expanded or contracted as circumstances arise. For example a small controller (5×4) may be derived for a kiln plant that uses simple planetary coolers. However, if the plant is modified to use grate coolers, then the control matrix can be expanded to include more CV's and MV's as applicable, for example to a (6×4) matrix.

It must be noted that the absolute values of the various variables are not as important as the relative values of the various controlled and manipulated variables to each other. It is thus important that these variables maintain these relative gains.

In the prototype controller, monitoring of the temperature profile was done using one temperature reading indicative of the temperature dynamics in the vicinity of the hood, as well as one temperature reading indicating the temperature either at the end of the kiln plant or somewhere in the middle. As can be seen from the control matrix, the coal or fuel being fed into the kiln is the primary "handle" used to control the temperature profile. This requires controlling the mass flow of coal being fed to the firing end of the kiln.

Control of the combustion process in the kiln is done by monitoring the $O_2$, CO and NOX gas states of the kiln. The $O_2$ and CO concentrations give an indication of how well the combustion process is taking place. If the CO is too high it means that there is possibly not enough $O_2$, etc. NOX is indicative of the actual flame temperature, and this could also be indicated by a pyrometer in the feed end of the kiln, as well as the actual hood temperature itself. In some cases the sensor instruments may not be available, and the controller is thus tuned or configured at runtime to ignore the particular reading and not take that particular gas CV into account.

The primary means for controlling the combustion process is to control the amount of air being drawn through the kiln. This is done primarily by controlling the ID-fan which, if it is a variable speed fan, is done by controlling its speed. There are usually air valves or dampers either upstream or down stream of the ID)-Fan, and these may also be used to control the kiln air flow. These dampers must be used if the ID-Fan is not a variable speed fan but a fixed speed fan.

The grate speed is adjusted to change the depth of the hot clinker on the grate and hence the amount of air and degree of heat transfer that takes place between the cooling air and the hot clinker. This will have an important effect on the temperature profile of the kiln.

A grate cooler has at least one (typically two) important associated manipulated variables (MV) which are used to control the secondary air flow from the cooler to the kiln. This MV is used primarily as a cooling handle on the kiln, as opposed to the coal which is used as a heating handle.

Air flow can also be controlled by varying the primary air feed into the kiln, which can be part of the coal firing system, as the coal is usually fed into the kiln pneumatically. Alternatively, this primary air feed may be separate from the kiln pneumatic system itself. However, this air flow is in general not really used as its contribution to the total air flow may be almost insignificant.

The above control of the cooler is changed depending on the particular cooler and controller that may be supplied with the cooler. Thus the control is over and above other independent control loops that are active in the cooler such as those effecting pressure control and working to create various zones or pockets of air within the cooler itself.

The kiln speed is directly coupled to the raw meal feed rate via the plant control system. This coupling is a direct ratio controller which allows the operator to select a production rate, and the control system will then automatically select the correct kiln speed to raw meal feed rate ratio, to allow for correct bed depth control in the kiln. The bed depth or the level of material in the kiln has an optimal level for correct and optimal clinker production.

On the test site, the kiln speed was configured as a disturbance variable (DV) which is set independently by the operator to meet certain production goals, and which the kiln controller automatically takes into account due to the fact that there exist cross couplings in the control matrix linking the kiln speed to various other controlled and manipulated variables. This allows the operator to speed up the production and have the system automatically take care of the resulting thermodynamic imbalances which will result due to the increase or decrease in kiln speed.

In a variation of the control scheme, the kiln speed and feed rate could be decoupled and treated as separate MV's.

As can be seen from the above, the primary means of thermodynamic control of the kiln is through the adjustment of the following equipment and settings: ID fan speed, the speed of the kiln, the flow rate of coal being fed into the kiln at both ends, and in the case of only certain coolers the speed of the coolers, and the air mass flow rate into the cooler. There are other items of equipment that may be used, but these are dependent on the actual physical design of the plant, and are generally set to a certain fixed state and left to operate in a constant mode.

Most kiln plants today have a number of base level controllers which perform some form of automatic control. The base layer controllers are based on industry standard off-the-shelf controllers which implement PID (Proportional, Integral and Derivative) controllers. In the subject plant in particular these controllers in general ensure that:

The weight feeders deliver according to desired setpoints;

The kiln and ID-fans maintain a desired speed;

The cooler fans deliver the correct amount of air for a given setpoint.

(There are about 20 PID's on the cooler at the subject plant);

The kiln hood pressure is maintained at a given value. This is done by adjusting the speed of the cooler exhaust fan; and The cooler speed remains on target.

All the setpoints for these PID controllers are usually set by the operator, and adjusted on a continuous basis by the operator in accordance with production goals.

In order for the thermodynamic controller to be integrated into the plant and to operate it must be fed all relevant variables in the plant, and must also be capable of sending variable control instructions back to the plant. The controller is thus connected to the plant via the plant control systems, which in the present case are based on a control product called "KICS" (Knowledge Based and Intelligent Control System) produced by Business Execution systems and Technology (SA) which in turn is based on the real time expert system "G2" from Gensym Corporation. The KICS control system effectively provides all SCADA functionality to the total cement plant.

The thermodynamic controller of the invention does not necessarily need the KICS or G2 systems, but can in principle be attached to any cement plant via whatever control system is installed on that plant. These control systems can be of any type or form but should satisfy a minimum specification in terms of control, connectivity, communications, and possibly pre- and post-processing of data, so that the data processing is easier to configure and set up.

The prototype system also uses another layer with the G2 system to provide a special custom process control wrapper around the Perfecter controller. This wrapper is an intelligent real time expert system that has certain rules and heuristics programmed in which allow for the correct operations of the thermodynamic controller. The expert system provides various filtering, spike rejection, and other signal conditioning and processing capabilities specifically developed to cope with the peculiarities of the prototype plant, as well as the special requirements of the thermodynamic controller.

In particular the expert system provides the means by which the purging and calibration spikes in the gas analyzers used to provide CO and O2 measurements can be rejected. These filters are special moving minimum filters that are also coupled moving and first order exponential filters.

The expert system also provides rules by means of which the correct or "best" analyzer is selected. In addition the expert system also provides the means by which various hard, fuzzy and/or maximum rate of change constraints on the Process Perfecter controller can be changed in real time due to varying plant conditions and production requirements.

The process control system for the subject plant consists of a Siemens S5 PLC system that interfaces directly with the cement and kiln plant. The system performs all analog and digital I/O, safety interlocks, PID control, and various other high speed processing. This system also provides full control of all motors on the plant via motor control centers (MCC's) located at the relevant points. The communication between the PLC's and KICS is performed via a SETCIM real time database. The overall structure of the plant control system is shown in FIG. 7.

From FIG. 7 it can be seen that the control system consists of 4 primary KICS control servers, with server terminals or operator screens. Three of the servers are capable of accessing or controlling the whole plant, while the fourth is specifically reserved to serve the cement loadout, packing and dispatching facilities. The KICS system is connected to the PLC via two SETCIM real time databases, through Aspentech H1 driver modules as well as KBE G2/SETCIM communication bridges.

All the KICS systems run on Hewlett Packard HP 9000 RISC computers, where the operating systems is HP UNIX, 10.20 or higher. This includes the SETCIM real-time databases, and communications modules which all execute on HP UNIX.

The controller connects to the control system via one of the three main plant KICS servers. Because each server has total plant access it does not matter which server is used, or that only one server is connected to a computer running Process Perfecter software. Process Perfecter itself executes on a HP Pentium II PC computer running Microsoft Windows NT 4.0.

Figure 8:
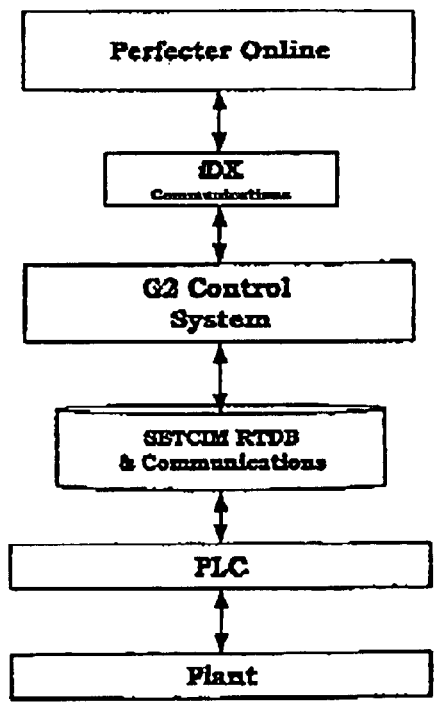
FIG. 8 is a simplified schematic diagram illustrating the integration of the controller of the invention with the control system of FIG. 7.

The overall architecture of the combined control system is shown in FIG. 8, from which it can also be seen that the Process Perfecter software connects through a communication system called iDX to talk to the KICS control server. iDX is a multi-protocol hub provided by Business Execution systems and Technology (SA) (Pty) Ltd which allows G2 to talk to Process Perfecter via the Process Perfecter OPC communication module.

Thus the thermodynamic controller of the present invention provides a controller which is placed in a closed loop with the cement kiln plant. The controller utilises the existing plant control system, to which it is connected by a communications layer, and is a model-based, multivariable predictive controller implemented in software.

A second aspect of the invention is directed towards the more direct control of the quality of the clinker.

The quality of the clinker is determined by analyzing its chemical composition. This is done in the laboratory, where samples of clinker are analyzed on a regular basis using various manual and/or automated procedures and equipment. Depending on how modem the plant is and the investment in the laboratory and sampling systems, each plant will measure a subset of all possible quality measurements available.

At the plant used to test the invention, the primary quality measurements of clinker used are the clinker free-lime FCAO, the Lime Saturation factor LSF, and clinker $3CaO.SiO_2$ (i.e. the amount of tri-calcium silicate in the clinker). Other control parameters that could be used and measured include liter-weights, $2CaO.SiO_2$, A2F etc.

The free-lime figure is important as it indicates how "hard" the clinker has been burnt (ie. the extent to which the clinker has been overburnt), and how much free-lime is left in the clinker after the clinkering process. Too high a free-lime content where the burning has been "soft" (underburnt), is undesirable, as free-lime decreases or degrades the quality of cement. $3CaO.SiO_2$ is one of the main final constituents of clinker. There is an optimal range of values of $3CaO.SiO_2$, and a maximum value of free-lime which should be maintained at all times. The optimal range of $3CaO.SiO_2$ is typically between about 55% and 75%.

Although zero free-lime would be ideal, the fuel costs associated with heating up the clinker to the degree whereby zero free-lime is achieved are too high, and thus the usual objective is to strive to balance free-lime at just below 1.5%. This gives the minimum required quality at possibly the lowest production cost, i.e. with minimum coal injection. The optimum point of 1.5% free-lime is not necessarily universal and may vary according to local plant design and cement production requirements.

Burning too "hard" to drive the free-lime figure very low has another detrimental affect on the clinker, which becomes extremely hard and difficult to crush, increasing downstream crushing costs, and hence increasing the cost of cement production.

The primary control objective of any kiln control system irrespective of whether it is automated or not, is to control the quality of clinker whilst maintaining production throughput and kiln stability. Quality control is the control of clinker $3CaO.SiO_2$ and clinker free-lime. This control involves achieving a desired setpoint for clinker $3CaO.SiO_2$ and free-lime, as well as the minimization of the quality parameter deviations. The control of the clinker quality must be done whilst at the same time maintaining mechanical safety, throughput and minimizing costs. However, there is presently no automated control of $3CaO.SiO_2$ or free-lime. Operators control manually to free-lime targets or other parameters close to free-lime.

The manual control that does exist with respect to the $3CaO.SiO_2$ or free-lime is the rejection of material that does not conform to required standards, as well as the subsequent adjustment of the thermodynamic state of the kiln in response to this problem. This material rejection occurs if, for example, free-lime is above about 2%. The ideal is to have free-lime between 1.0 and 1.5%.

Because the automatic or direct control of free-lime is manual, operators bum either harder or softer to either decrease or increase the amount of free-lime in clinker, respectively. There are also other subsequent manual procedures implemented by operators of the plant to compensate for raw meal feed problems etc, which contribute to high free-lime levels to bring free-lime and $3CaO.SiO_2$ back into the regime where it is acceptable in terms of clinker and cement quality control.

The difficulty with this manual control of either free-lime or $3CaO.SiO_2$ is that there are many unmeasured and measured disturbances in the kiln, for example, a measured disturbance in the quality of the incoming raw meal, in terms of actual values and deviations.

Thus, the second aspect of the present invention attempts to control the kiln plant in a multi-layered manner where two or more control objectives are always being evaluated. The first or lower level control task is the thermodynamic control of the kiln, as described above. The objective of this task is to maintain the kiln in a thermodynamic state that enables the production of clinker at the right quality, and at required production rates, within various costs and mechanical and process constraints. The next layer of control is the adjustment of the thermodynamic state on the basis of the desired free-lime content of the clinker. The next layer of control is the adjustment of the free-lime setpoint to ensure that the $3CaO.SiO_2$ content of the clinker and hence the cement is within specification.

It will be appreciated that $2CaO.SiO_2$ could also be considered an important measure of clinker quality. As such, the $2CaO.SiO_2$ content of the clinker could be controlled, as could any other important chemical property.

The preferred embodiment of the controller thus provides three layers of control, namely an inner thermodynamic controller, an intermediate layer free-lime controller and an outer layer $3CaO.SiO_2$ controller. The implementation of the free-lime controller is optional and depends on whether measurements of the free-lime are available in the plant control system. In some cases this second level controller may be a "liter-weight" controller rather than a free-lime controller.

The liter-weight is the manual measurement of the mass of clinker filling a liter container. The clinker used in this measurement is pre-screened to a certain size fraction. Thus this measurement gives a measure of the reactivity of the clinker, or surface area per unit mass of clinker. It is a manual alternative to get a good indication of how well the clinker is being manufactured, and it's chemical and metallurgical properties. The free-lime controller can be replaced with a "liter-weight" controller, where the thermodynamics of the kiln are controlled in a manner similar to the free-lime controller to maintain a certain "liter-weight" specification.

In the light of the above, the controller can be generalized as being a two layered controller with the lower level being a thermodynamic controller, and the higher level being a quality controller, with the quality controller being capable of being divided up further into two or more layered controllers, namely the intermediate free-lime controller and the outer $3CaO.SiO_2$ controller.

A first embodiment of the prototype three-tier or three layer controller is shown schematically in FIG. 9. As there are no direct control actions that can be taken on the plant to control clinker $3CaO.SiO_2$ and free-lime, control of these quality parameters is indirect, and is done by adjusting the thermodynamic and operating state of the kiln in response to the properties of the raw meal and fuel being fed into the kiln, as well as the emerging clinker properties.

The higher level controllers only deal with trying to maintain quality which is shown to be a fairly slow moving dynamic, while production optimisation and the other issues are dealt with in the lower level thermodynamic controller 46.

In the hierarchical structure of the controller the thermodynamic controller 46 is given setpoints for maintaining the thermodynamic state as determined by the higher level controller so as to maintain free-lime, or $3CaO.SiO_2$ quality levels. In the first illustrated embodiment of the invention, this higher level controller is firstly the $3CaO.SiO_2$ controller, which then feeds the free-lime controller with a dynamic free-lime target, which is the required free-lime as issued by the $3CaO.SiO_2$ Controller to steer the $3CaO.SiO_2$ back to target. The relationship between $3CaO.SiO_2$ and free-lime will be described below.

The $3CaO.SiO_2$ controller 42 accepts a target value for $3CaO.SiO_2$, as well as the current $3CaO.SiO_2$ as measured on the plant by the laboratories.

The current $3CaO.SiO_2$ value is fed back to the $3CaO.SiO_2$ controller 42 using a first feedback loop 48. The controller then calculates a free-lime value that will bring the current $3CaO.SiO_2$ process value to the target value, whilst taking into account other factors which affect $3CaO.SiO_2$.

In this controller the $3CaO.SiO_2$ is the controlled variable, and the free-lime is the manipulated variable.

The basic relationship between $3CaO.SiO_2$ and free-lime has been derived in a number of ways which are used to derive the top level $3CaO.SiO_2$ controller relationship.

The first is an empirical mathematical relationship where $$3CaO.SiO_2 = f(FcaO, LSF, SRALM) \text{ and } = f\{CaO, SiO_2, Al_2O_3, TiO_2, Fe_2O_3, Mn_2O_3, SO_3\}$$

Where FCaO is free-lime

SR is the silica ratio

LSF is the lime saturation factor

ALM is the alumina modulus and the others are various chemical oxides, etc

The various chemical analyses are calculated from X-ray analysis of the various samples taken in the plant on raw meal and clinker, and then used to calculate the values of SR, ALM, LSF, etc. SR and LSF, which are fed back to the $3CaO.SiO_2$ controller together with the measured $3CaO.SiO_2$ content, as is shown at 49.

The second relationship is a neural network relationship where various plant variables and $3CaO.SiO_2$ are the inputs and the output is $3CaO.SiO_2$. This neural network is optional and is used to provide estimates for $3CaO.SiO_2$ during the sample times of the actual $3CaO.SiO_2$ laboratory measurements. If the neural network is not possible due to lack of various inputs, the neural network can be replaced with a sample and hold or predictor type estimator of $3CaO.SiO_2$.

The third relationship uses a basic equation $$\frac{d\,FCaO}{d\,C_3S} = \frac{FCaO_{target} - FCaO_{setpoint}}{C_s S_{target} - C_s S_{labt}}$$

Figure 10:
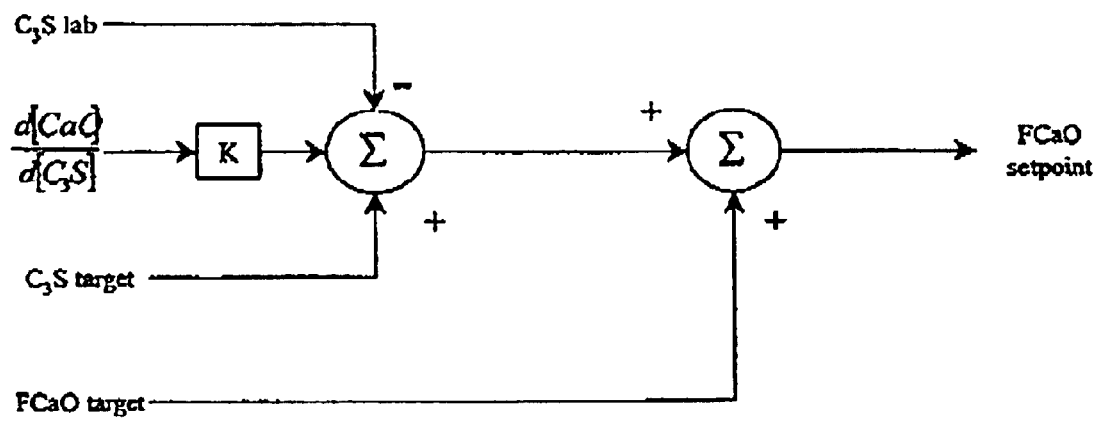
FIG. 10 is a schematic block diagram showing the relationship between $3CaO.SiO_2$ and free lime.

This relationship is shown implemented in the block diagram of FIG. 10.

In the free-lime controller 44, the measured free-lime from the plant is fed back to the controller 44 using a second feedback loop 50, and is compared to the free-lime setpoint or free-lime target. The free-lime controller 44 then determines what the required thermodynamic targets 52 should be in order to meet the target free-lime, i.e. to reduce the free-lime error to zero.

There are a variety of definitions of the error to which the Process Perfecter controller is to operate. The first and obvious type is the deviation or difference between actual and desired controlled variables such as free-lime. However, the error could also be the amount by which the free-lime value intrudes out of an allowed regime of operation into a fuzzy or hard limit area of undesirable operation.

The thermodynamic targets used in the prototype as the output of the free-lime controller, and constituting the controlled variables, are as follows:

Hood temperature

Backend temperature

Required CO level

Required NOX level

Required $O_2$ level

The free-lime controller 44 gets its actual plant measurement or current process value of free-lime from one of two sources.

(1) The first is a neural network based free-lime predictor or virtual on-line analyser (VOA) 54, which predicts the current instantaneous free-lime value from various plant process parameters, including the plant quality lab values 40.

(2) If for some reason the free-lime predictor or virtual on-line analyser (VOA) does not work, then the free-lime controller receives its free-lime value from the actual plant laboratory quality control system 40 and 56. This is fed in automatically from the plants' quality control systems via the plant control system, or is fed in by hand into the plant control system, if the communications link between the plant quality control system and the plant control system fails.

The free-lime controller 44 examines both the free-lime target and the actual free-lime, and then based on this error outputs calculates what the required setpoints for the thermodynamic variables are. The free-lime controller calculates a profile of moves into the future that it will perform to the manipulated variables in order to reduce the error to zero, or close to zero. The shape of this profile of moves is dependent upon:

(a) the models between the manipulated and controlled variables, and (b) the tuning parameters that are given to the controller in respect of each controlled variable/manipulated variable pair.

The model of how manipulated variables influence free-lime is stored in a matrix of relationships in the controller software. These relationships are typically first or second order time responses, which are the responses of the free-lime to step changes with the value of the thermodynamic manipulated variables. In other words how:

(a) Free-lime changes in responses to a step change in the percentage coal to be fed to the back end of the kiln;

(b) Free-lime changes in response to a step change in hood temperature;

(c) Free-lime changes in response to a step change in backend temperature;

(d) Free-lime changes in response to a step change in CO levels;

(e) Free-lime changes in response to a step change in NOX levels.

The models of these step response relationships were established by cement experts and operators on the plant, as well as by examining the relationship between captured data of free-lime and changes in these variables. These data were captured from normal running operations that were stored in a real time database, as well as from explicit step tests that were taken during the time of the project step test phase.

The five responses for the free-lime controller are all second order critically damped responses.

For example, a change in Thood from 1000 to 1500 degrees i.e. 500° C. would induce a change of approximately 0.1% in free-lime FCaO. This amounts to a gain of 0.0002 and because the increase in temperature drops the free-lime, the gain is negative. The absolute values are not important, but rather the relative values. To make the absolute values look more realistic when simulating, one adjusts an offset to bring the absolute values in line with real plant values.

At present the free-lime controller assumes that the gains of each of the four responses are constant, i.e. that the gains are linear. However, these gains may be made to be functions of the plant states themselves, i.e. to be non-constant. In this case the gains will change depending on the plant conditions. This situation (when the gains are a function of the plant state) is the non-linearity that is generally displayed by all processes.

So for example, assuming that a 1° change in hood temperature gives a −0.002% change in free-lime, if the hood temperature increases from 1000° C. to 1050° C. this value may change by −0.1%.

The free-lime gains used in the prototype free-lime controller were as follows:

Thood gain: −0.002
Tback gain: −0.001
CO gain: 10
NOX gain: −0.004

As the current system thermodynamic controller 46 has five controlled variables, there is the potential to set or determine all five of these controlled variables, using the quality controller. Thus the controller for free-lime only is a 1×5 or 1×N controller. Should a plant desire to control clinker free-lime and clinker LSF, for example, at this level then this controller will become a 2×5 controller.

In the prototype kiln, four of the controlled variable targets came from the free-lime controller, while the O2 target was input manually by an operator. Thus it is possible to add and remove various controller and manipulator variables depending on the particular setup of the kiln.

Another possible embodiment of the free-lime or quality controller, is that the controller can be implemented either as a combination of mathematical relationships as given above or by heuristic relationships or rules. This is a possible alternative that uses the expert system shell or other software to implement the relationships between the free-lime and the inputs to the thermodynamic controller.

This use of rules with the controller is an option that is determined by the type of kiln, control infrastructure, and the degree of automation required and associated complexity that comes from the degree of benefit or value added. This way of implementing the quality controller is just an alternative in terms of technology chosen, and is used to illustrate the relative independence of the controller from the type of technology.

FIG. 11 illustrates an alternative embodiment of the second aspect of the invention. In this embodiment, the quality controller is partially parallel to and partially cascaded to the thermodynamic controller 46.

The output of the free-lime controller 44 is both actual plant manipulated variables and possibly one or more thermodynamic variables. In a first mode of operation, the free-lime controller outputs the setpoint of the percentage coal to the back end of the kiln, while the other setpoints are controlled by the thermodynamic controller 44. Thus the setup is a partially cascaded configuration in that the 3CaO.SiO$_2$ controller 42 is cascaded to the free-lime controller 44, and that these two together operate in parallel with the thermodynamic controller 46.

Although the manipulated variable, percentage coal to the back (%C back), is controlled by the free-lime controller, its effects as a disturbance to the thermodynamic controller is still taken in to account, and at any time it can be activated so that the thermodynamic controller can control the percentage back end coal as well.

Dotted lines 58 in the Figure illustrate the built-in possibility of this embodiment being configured to the same layout as the first embodiment, in which the output of the free-lime controller 44 will be inputted to the thermodynamic controller 46 only. This is to allow the controller to be adapted for use on kilns with no coal feed to the back end of the kiln. Thus the indirect method of deriving a thermodynamic output from the free-lime controller in a cascaded configuration to control the thermodynamic controller will be the configuration used in this case.

When the thermodynamic controller and free-lime controller are working in tandem, the goal is to produce good quality clinker by the controllers together creating a stable and correct thermodynamic environment in which the various clinkering processes can take place. The temperature profile is controlled by manipulating two profile variables, i.e. the profile level or height and the slope of the temperature profile. The two corresponding handles are the hood temperature and the back end coal feed, which are controlled by the thermodynamic and free-lime controller respectively.

FIG. 12 illustrates a third embodiment of the second aspect of the invention.

This embodiment focuses on the fact that the primary quality parameter of clinker is the $3CaO.SiO_2$ component. Thus this embodiment attempts to control $3CaO.SiO_2$ whilst allowing the free-lime value to range freely within its constraints, ie. below the maximum level of 1.5%, for example.

The main disturbances that influence the $3CaO.SiO_2$ content of the clinker are the thermodynamic conditions in the kiln, the properties of the incoming raw material and the properties of the coal or fuel used in the kiln. Thus the $3CaO.SiO_2$ controller 42 receives a setpoint for the $3CaO.SiO_2$ value together with measurements indicative of various properties of the incoming raw material and fuel used in the kiln. The $3CaO.SiO_2$ controller 42 then outputs a target to the thermodynamic controller 46. In the present embodiment, this target is the target hood temperature Thood, but other temperature readings could equally be used, such as the NOX reading or one or more back end temperature readings.

The $3CaO.SiO_2$ controller 42 may also input the free-lime target to the free-lime controller 44, as indicated by dotted line 60 in the Figure.

The overall controller of the invention is run by executing the Process Perfecter software and all relevant communications modules or executables on the designated computer. When these executables run, bi-directional communications are automatically established with the kiln plant DCS, and the Process Perfecter as well as on-line neural network modules start executing immediately. However, initially or unless otherwise specified, the controller does not run the plant, and the operators are still in control. This is because MV setpoints transmitted from the controller to the control system are not transmitted to the field, until appropriate software switches in the DCS or SCADA system are closed. Full closed loop control is enabled when these setpoint switches in the control system are switched on.

When the controller is in control of the kiln plant, the operator can monitor, adjust, fine tune and change the controller's behaviour. This also includes enabling or disabling the inclusion of the higher level controllers. This control is performed either via Process Perfecter's own GUI's or via GUI's engineered in the control system. The final engineered solution allows explicit control and adjustment of the control system goals, constraints and tuning parameters both from the DCS/KICS GUI's and the Process Perfecter GUI. The use of external GUI's to perform this control is facilitated by the availability of the Process Perfecter GUI parameters via the PDI to the external control system.

The controller's functions are made up of the basic functionality of the Process Perfecter software as well as additional functionality engineered into the external control system. The Process Perfecter GUIs's provide the following control functionality with respect to the controller:

(a) Control of each SISO controller cell from the total control matrix, which can be switched on or off. This allows for either full or selective control of the kiln plant. Thus the thermodynamic controller can be used for example to control the cooler only, or the kiln temperatures only.

(b) The operator can change targets or setpoints for any controlled or manipulated variable in any level controller. Obviously if a higher level controller is active in the loop then individual settings of targets in lower level controller will be overwritten by the higher level controller. Setting a manipulated variable to a certain target implies that the variable can not be used for control, and this constrains what the controller can do to control the kiln.

(c) The speed of the kiln has been made a disturbance variable, and is thus controlled by the operators. The speed of the kiln is directly linked to the raw meal feed, thus changing the speed of the kiln, changes the feed rate of raw meal into the kiln, and hence is a major known disturbance into the kiln. The philosophy of controlling throughput via the kiln speed is used because the raw meal feed is a slave to the speed of the kiln i.e. the raw meal feed is in linear cascade to the speed of the kiln. Thus in other kilns the controller may use either kiln speed or raw meal feed or both.

(d) The operators can set various hard constraints onto every MV or CV. These hard constraints allow for the operating range of the plant to be set in terms of the minimum or maximum excursions the manipulated variables can take in terms of control. Setting hard constraints on the controlled variables, does not mean that they cannot be violated, but does mean that severe penalties will be incurred should they violated, and the controller will bring all effort into reducing these hard constraint violations.

(e) Soft or fuzzy constraints. All variables in the controller's matrix can be given soft constraints. Violation of the soft constraints means that the variable will incur an ever increasing cost penalty with regard to its violation. This implies that if necessary the controller will violate these constraints, but will eventually endeavor to minimize these constraints on the basis of all other constraints within the system, hence allow for optimizing of the kiln plant in terms of unstable or bad excursions of various process variables.

(f) Priorities and weights. All constraints, targets, etc can have various weights, or costs, that allow one to tune the kiln plant so that various process deviations take priority over others, hence ensuring that correct control action will be taken on the kiln. Because the priorities etc, can be changed at run time, this implies that the tuning of the optimization of each controller can be adjusted by either operator of the plant control system providing for adaptive optimisation of the controller according various criteria.

(g) Frustums. Frustums are similar to soft or fuzzy constraints, except that the penalties incurred become more severe with time. This means that the controller endeavors at all times to bring any target within the frustum so as to minimize process deviations with time into the future.

(h) Rate of change constraints. Each process variable (in particular Manipulated Variables) has a maximum rate of change setting that can be set for either up or down movements. This provides a safety mechanism in that various control actions over time can be limited or constrained so as not introduce too severe a change into the kiln hence making it unstable.

Due to the graphic user interface features of the Process Perfecter software, the controller provides a full multivariable view of the plant and its status. These views consist of real time plot and trends that display the present and past history of all variables used in the controller. These views also incorporate predictions of the future behavior of the cement kiln plant. Thus the operator can see what his/her or the controller's effect on the plant will be into the future for a time horizon that can be set by the user.

Various control and optimisation mechanisms can be introduced into the controller that fulfill the operational, safety, and business objectives of the kiln plant. For example, to optimize the kiln in terms of costs incurred due to production, the coal settings will be set so that too high a coal usage will incur a high penalty. Thus if the use of the ID fan or another manipulated variable is set to a lower cost or priority than coal, the controller will make more use of secondary air from the cooler in a bid to maintain the high temperature required, instead of putting more coal into the kiln. This type of control strategy will obviously be offset or traded against the need to maintain high temperatures, but not too high, and thus the controller will evaluate these needs against for example the NOX targets, which are indicative of the flame temperature.

The benefits of the controller run on the test plant were numerous.

Variations on the hood temperature were reduced markedly compared to prior operation of the kiln, especially in the presence of major disturbances into the kiln plant system such as "poking" and "coating drops". In addition the controller maintained control through these periods of disturbance, whereas prior art controllers have not been able to cope with the disturbance and have relinquished control of the kiln to special sub-routines designed only to cope with such situations.

Furthermore, the controller has coped well with off-specification feed material which has high or low LSF in the incoming raw meal feed. High LSF implies that more energy is required to perform the calcining process. This problem is usually temporary and can cause the free-lime content in the clinker to be high and hence result in off specification clinker.

Furthermore, the back-end temperature of the kiln under the controller has been observed to be steady at optimal temperatures, i.e. at designed low levels that indicate optimal energy absorption terms of the calcining and the reduction of heat vented to atmosphere.

The CO levels were maintained within safety levels, and when highs or excursions occur the controller reacts optimally and safely to bring the CO levels back into the same range.

The controller maintained $O_2$ levels within the desired operating range.

Sustained higher throughput or production rates have been realized that are much higher than achieved under operator control.

Use of the controller resulted in a significant improvement in kiln efficiency (ie. the amount of energy consumed per ton of clinker) and hence resulted in significant electrical energy savings.

Use of the controller also resulted in a significant saving in refractory bricks due to better kiln stability.

Additionally, savings on electricity were also noted.

Clinker free-lime is maintained for longer periods of time within the target values and with smaller deviations, and off specification clinker levels were much lower than previously experienced. Because of this, the off specification clinker silo was quickly empty.

The controller had near to 100% up time, and enjoyed operator and management acceptance. The system made fewer demands on the operators, resulting in a need for fewer operators.

All of the above resulted in large cost savings.

Thus it will be appreciated that the present invention provides a control system which not only provides an advanced thermodynamic controller, but which integrates the quality and thermodynamic control of a kiln plant.

What is claimed is:

1. A controller for a kiln plant comprising a kiln having a firing end and a back end, wherein fuel is combusted at the firing end and raw meal is fed into the back end for conversion to clinker in the kiln, the controller comprising:
a first temperature sensor arranged to measure the temperature at or near the firing end of the kiln and to generate an output indicative of this temperature;
gas sensing means arranged to measure the concentration in the kiln of at least one gas from the group comprising $O_2$, NOX, SOX and CO and to generate at least one respective output indicative of the relevant gas concentration; and
control means adapted to receive the output from the first temperature sensor and to control the amount of fuel fed to the firing end of the kiln to maintain the temperature at or near the hood of the kiln within a predetermined range, the control means being further adapted to receive said at least one output from the gas sensing means and to control at least a main impeller of the kiln to maintain the concentration of said at least one gas within a predetermined range,
thereby to maintain a desired thermodynamic profile in the kiln to control and optimise the properties of clinker produced therein.

2. A controller according to claim 1 which further comprises a second temperature sensor arranged to measure the temperature at or near the back end of the kiln and to generate an output indicative of this temperature, the control means being further adapted to receive the output from the second temperature sensor and to control the amount of fuel fed to the back end of the kiln to maintain the temperature at or near the back end of the kiln within a predetermined range.

3. A controller according to claim 2 wherein the control means further includes a control matrix which includes values determinative of the relationships between a plurality of plant measurements including the temperature at or near the hood of the kiln, the temperature at or near the back end of the kiln, and $O_2$, NOX, SOX and CO concentrations, and a plurality of operating parameters including the amount of fuel fed to the firing end of the kiln, the amount of fuel fed to the back end of the kiln, the main impeller speed, the kiln speed, the kiln main drive current, the raw meal feed, the cooler air flow and cooler grate speed.

4. Control means for a kiln plant, the control means comprising an outer quality controller cascaded to at least one inner controller, wherein the outer quality controller comprises a first feedback controller being adapted to receive a first setpoint input indicating a desired amount of $3CaO.SiO_2$ and/or $2CaO.SiO_2$ to be present in clinker produced by the kiln plant, and a second feedback input indicating the actual amount of $3CaO.SiO_2$ and/or $2CaO.SiO_2$ present in clinker being produced by the kiln plant, the first feedback controller being further adapted to compare the first setpoint input and the second input and, if the inputs differ, to produce an output to alter a setpoint input to the inner controller directly or indirectly to adjust one or more of the kiln plant's operating parameters so that the amount of $3CaO.SiO_2$ and/or $2CaO.SiO_2$ in the clinker produced by the kiln plant will be substantially equal to the desired amount of $3CaO.SiO_2$ and/or $2CaO.SiO_2$ of the clinker.

5. Control means according to claim 4 wherein the inner controller is a free lime controller, wherein the second setpoint input comprises a dynamic setpoint for the free lime content of the clinker to the inner controller, and wherein the inner controller is adapted to receive an input indicating the actual amount of free lime present in clinker being produced by the kiln plant, the inner controller being further adapted to compare the dynamic setpoint for the free lime content and the actual amount of free lime present and, if these differ, to produce an output to directly or indirectly alter one or more of the kiln plant's operating parameters so that the amount of free lime present in the clinker produced by the kiln plant will be substantially equal to the dynamic setpoint for the free lime content.

6. Control means according to claim 5 wherein the control means further includes a thermodynamic controller, cascaded to the inner controller, wherein the inner controller outputs a setpoint for at least one plant measurement to the thermodynamic controller, and wherein the thermodynamic controller is adapted to receive an input from the kiln plant indicating the value of the at least one plant measurement, the thermodynamic controller being further adapted to compare the setpoint for the at least one plant measurement and the value of the at least one plant measurement and, if these differ, to produce an output to alter one or more of the kiln plant's operating parameters.

7. Control means according to claim 5 or claim 6 wherein the inner controller is arranged to output a plurality of dynamic setpoints for a plurality of plant measurements to the thermodynamic controller, the plurality of plant measurements constituting controlled variables and being selected from the group including the back end temperature, the hood temperature, the level of CO, the level of NOX, the level of SOX and the level of $O_2$.

8. Control means according to claim 5 wherein the kiln plant's operating parameters comprise one or more of the group constituting manipulated variables comprising the total fuel fed to the kiln plant, the percentage fuel fed to the back of the kiln plant, the main impeller speed, the kiln speed, the cooler air flow and the cooler grate speed.

9. Control means according to claim 8 which is arranged to manipulate the parameters to alter the plant measurements to approach respective setpoints, using a control matrix which includes values determinative of the relationships between the operating parameters and plant measurements.

10. Control means according to claim 5 wherein the control means further includes a thermodynamic controller connected to the kiln plant, wherein the thermodynamic controller is adapted to receive an input from the kiln plant indicating the value of at least one plant measurement, the controller being further adapted to compare a setpoint for the at least one plant measurement and the value of the at least one plant measurement and, if these differ, producing an output to alter one or more of the kiln plant's operating parameters, wherein the at least one of the kiln plant's operating parameters controlled by the thermodynamic controller is different from the one or more operating parameters controlled by the free lime controller.

11. Control means according to claim 10 wherein the at least one or more of the kiln plant's operating parameters controlled by the thermodynamic controller comprise at least one of the group comprising the total coal fed to the kiln, the main impeller speed, the kiln speed, the raw meal feed, the cooler air flow and the cooler grate speed and wherein the kiln plant's operating parameter controlled by the free lime controller is the percentage fuel fed to the back of the kiln.

12. Control means according to claim 5 wherein the inner controller is a thermodynamic controller, wherein the second setpoint input from the outer quality controller to the thermodynamic controller is a setpoint for at least one plant measurement, and wherein the thermodynamic controller is adapted to receive an input from the kiln plant indicating the value of the at least one plant measurement, the thermodynamic controller being further adapted to compare the setpoint for the at least one plant measurement and the input indicating the value of the at least one plant measurement and, if these differ, to produce an output to alter one or more of the kiln plant's operating parameters.

13. Control means according to claim 12 wherein the at least one plant measurement is one or more of the plant measurements selected from the group including the back end temperature, the hood temperature and the level of NOX.

14. Control means according to claim 13 wherein the selected plant measurement is the hood temperature.

15. Control means according to any one of claims 12 to 14 wherein the control means include a free lime controller arranged to receive a setpoint input for the free lime content of the clinker and an input indicating the actual amount of free lime present in clinker being produced by the kiln plant, the free lime controller being further adapted to compare the setpoint for the free lime content and the input indicating the actual amount of free lime present and, if these differ, to produce an output to directly or indirectly alter one or more of the kiln plant's operating parameters so that the amount of free lime present in the clinker produced by the kiln plant will be substantially equal to the setpoint for the free lime content.

16. Control means according to claim 15 wherein the setpoint for the free lime is received from the $3CaO.SiO_2$ controller.

17. Control means according to claim 15 wherein the setpoint for the free lime is manually input by an operator of the controller.

18. Control means according to claim 15 wherein the one or more operating parameters controlled by the free lime controller are different from the one or more operating parameters controlled by the thermodynamic controller.

19. Control means according to claim 15 wherein the operating parameter controlled by the free lime controller is the percentage fuel fed to the back of the kiln.

\* \* \* \* \*